Nov. 19, 1946.　　　B. N. ASHTON　　　2,411,315
METAL BELLOWS ACCUMULATOR
Filed Oct. 27, 1944
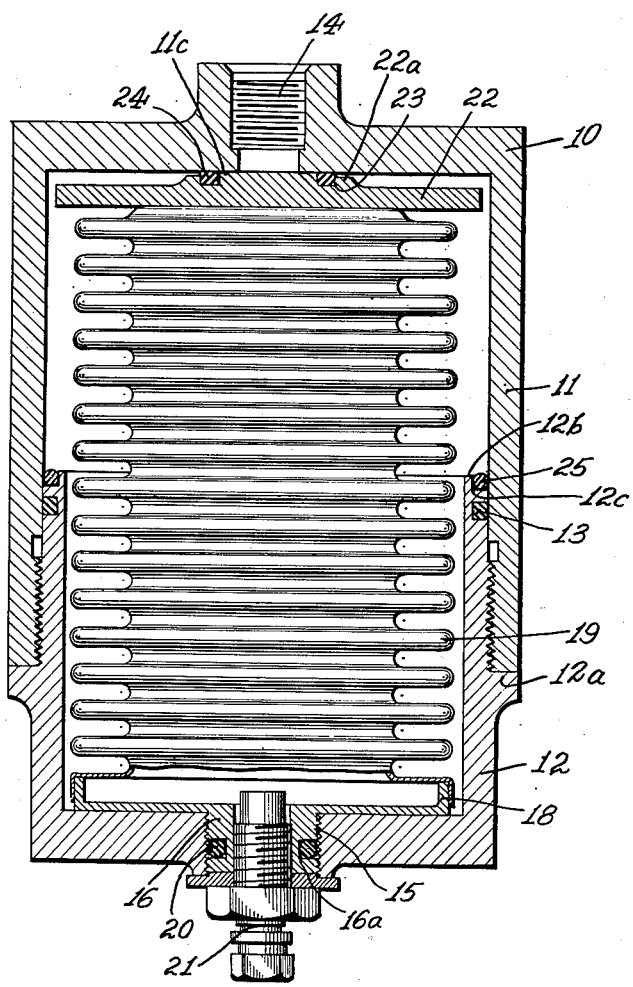
INVENTOR.
BENJAMIN N. ASHTON
BY
ATTORNEYS Patented Nov. 19, 1946

2,411,315

UNITED STATES PATENT OFFICE 2,411,315

METAL BELLOWS ACCUMULATOR

Benjamin N. Ashton, Kingston, N. Y., assignor to Electrol Incorporated, Kingston, N. Y., a corporation of Delaware Application October 27, 1944, Serial No. 560,702

5 Claims. (Cl. 138—31)

This invention relates to accumulators for use in hydraulic systems for aircraft, for example, which are utilized to control the operation of retractable landing gears, wing flaps, and the like.

The accumulators heretofore provided usually consist of a tank or receptacle capable of withstanding high pressures and which is provided with a resilient diaphragm usually formed of rubberized fabric dividing the receptacle into two chambers. A gas under pressure is supplied to one of the chambers in order to oppose the pressure of the hydraulic fluid in the other chamber whch is connected to the hydraulic system.

Inasmuch as the pressure in the hydraulic system fluctuates, the capacity of the hydraulic fluid receiving chamber of the accumulator varies in order to store excess liquid and to accumulate pressure liquid which may be utilized to operate the mechanical elements associated with the system and to smooth the fluctuations of pressure in the system.

When the volume of the fluid in the accumulator varies during the operation of the hydraulic system, the diaphragm is flexed back and forth with the result that it ultimately is weakened and a leak may develop which permits mixing of the compressed gas with the liquid. Also, if the gas pressure or liquid pressure in the system drops, the diaphragm may be expanded to such an extent that it is ruptured or damaged.

It has been proposed heretofore to provide valves in the accumulators that will prevent the complete escape of liquid from the accumulator, so that a bellows or a diaphragm will be supported by trapped liquid even if the liquid pressure in the system should drop to zero.

All of the above described accumulators have the disadvantage of being difficult to pre-load either with hydraulic fluid or with gas under pressure without damage to the accumulator, for the reason that it is difficult to charge both chambers of the accumulators simultaneously to equal pressure during the installation of the accumulator.

An object of the invention is to provide an accumulator that can be preloaded with hydraulic fluid without danger of damaging the accumulator.

Another object of the invention is to provide an accumulator having a flexible metallic bellows and safety control valves which prevent damage to the bellows by variations in pressure of the hydraulic fluid and the gas in the accumulator.

A further object of the invention is to provide a metallic bellows type of accumulator for a hydraulic pressure system in which the bellows is protected against damage by means of liquid trapped in the accumulator, when the pressure of the gas and the hydraulic fluid are unequal.

Other objects of the invention will become apparent from the following description of a typical form of accumulator embodying the present invention.

Accumulators of the type embodying the present invention may suitably consist of a hollow cylindrical receptacle provided with a metallic bellows, such as a "Sylphon" bellows, having a free end provided with a valve member that cooperates with a valve seat in the end of the cylinder and a valve seat spaced axially from the end of the cylinder. The valve member is adapted to engage the valve seat at the end of the cylinder upon expansion of the bellows to a predetermined point, whereby liquid will be trapped in the space between the bellows and the receptacle, thereby preventing bursting of the bellows under the gas pressure therein.

The valve member on the bellows also is adapted to engage the other valve seat to limit the extent of the compression of the bellows and also to trap liquid around the bellows, so that the bellows will not collapse upon decrease of the air pressure therein or the generation of an excessively high fluid pressure in the hydraulic system.

Accumulators of the type embodying the present invention are protected against damage by variations in the pressures of the pressure gas and the hydraulic fluid, and thus, if desired, the accumulator can be preloaded with hydraulic fluid when placing it into operation without the bellows being damaged. Thereafter, gas under pressure can be introduced in order to charge the system to the desired operating pressure. Similarly, the accumulator may be charged with gas under pressure before it has been brought up to the operating pressure of the hydraulic system without exploding or rupturing the bellows.

For a better understanding of the present invention, reference may be had to the accompanying drawing in which the single figure is a view in vertical section of a typical form of accumulator embodying the present invention.

The form of accumulator chosen for purposes of illustration includes a cylinder 10 formed of a generally cylindrical and cup-shaped receptacle member 11 which receives telescopically, and is threaded onto, a second generally cup-shaped cylindrical element 12. The edge of the member 11 abuts against a shoulder 12a on the lower cylinder member 12 when the two elements 11 and 12 are connected. Leakage between the elements 10 and 11 is prevented by means of a suitable gasket or sealing ring 13. The member 11 is provided with a port 14 therethrough that is threaded internally in order to permit it to be coupled with a hydraulic system, not shown.

The cylindrical cup-shaped element 12 is also provided with a central opening 15 for receiving an annular bushing 16 which projects outwardly from a disk-like flanged base 18 secured to the lower end of a metallic bellows 19. The bellows 19 may be of the "Sylphon" type or any other equivalent contractable and expansible metallic bellows construction. The bushing 16 may be threaded into the opening 15 and is provided with an annular groove 16a for receiving a rubbery sealing ring 20.

An air check valve 21 is mounted in the bushing 16 to permit gas under pressure to be introduced into the interior of the bellows 19.

The upper end of the bellows 19 is provided with a disk-like plate 22 which has an annular groove 23 in a raised or thickened portion 22a of the plate for receiving a rubbery toroidal ring 24 in its upper surface. The ring 24 cooperates with the inner end 11c of the receptacle member 11 to form a check valve for preventing escape of liquid from between the bellows 19 and the cylinder 10 through the port 14.

The plate 22 projects laterally beyond the periphery of the bellows 19 and cooperates with a valve seat formed by the upper edge 12b of the member 12 and a toroidal, rubbery sealing ring 25 mounted in a groove or recess 12c therein. When the bellows 19 is compressed by an increase in pressure in the hydraulic system, the edge of the plate member 22 engages the rubbery ring 25 and the valve seat 12b, thereby preventing the pressure of the liquid in the space between the bellows 19 and the member 12 from exceeding the pressure within the bellows 19.

In operation, the accumulator may be connected to the hydraulic system through the port 14, and the pressure in the system may be built up, thereby compressing the bellows 19 until the plate member 22 engages the seat 12b and the rubbery ring 25. Under these conditions, the exterior of the bellows will not be subjected to any greater pressure than that required to compress it to such a condition that the plate 22 engages the valve seat 12b, and accordingly, the bellows will not be damaged. After this condition has been attained, gas under pressure may be introduced through the air check valve 21 into the bellows until a desired gas pressure is provided within the bellows. If this gas pressure materially exceeds the pressure in the hydraulic system, the plate member 22 will be forced against the end 11c of the cylinder 10, with the result that liquid is trapped between the bellows 19 and the wall of the cylinder 10, and the pressure of the gas is resisted by the trapped liquid.

From the preceding description, it will be apparent that a metal bellows accumulator has been provided in which the bellows will not be damaged by wide pressure differentials on its opposite sides and in which the bellows is protected against damage during the period when it is being assembled in the hydraulic system and charged or preloaded to its desired operating pressure.

It will be understood that the accumulator is susceptible to considerable modification and that the type and shape of the bellows, as well as the construction of the tank, can be varied widely without departing from the invention. Therefore, the form of the invention described above should be considered as illustrative and not as limiting the scope of the following claims.

I claim:

1. An accumulator for hydraulic systems comprising a hollow, tubular cylinder having closure members at its opposite ends, means in one of said closure members for connecting said cylinder to a hydraulic system, an expansible and compressible metallic bellows having one end secured to the other closure member and having a free end expansible toward said one of said closure members, means for introducing a gas into the interior of said bellows, a valve seat member in said cylinder disposed outwardly of said bellows, and a valve member on said free end of said bellows engageable with said valve seat member upon compression of said bellows to trap hydraulic fluid between said cylinder and said bellows and prevent collapse of said bellows.

2. An accumulator for hydraulic systems comprising a hollow, tubular cylinder having closure members at its opposite ends, means in one of said closure members for connecting said cylinder to a hydraulic system, an expansible and compressible metallic bellows having one end secured to the other closure member and having a free end expansible toward said one closure member, means for introducing a gas into the interior of said bellows, cooperating valve and valve seat members carried by said one closure member and said free end of said bellows, said valve and valve seat members being engageable upon expansion of said bellows for trapping hydraulic fluid between said cylinder and said bellows to prevent overexpansion of said bellows, a second valve seat member in said cylinder disposed outwardly of said bellows, and a valve member on said free end of said bellows engageable with said second valve seat member upon compression of said bellows to trap hydraulic fluid between said cylinder and said bellows and prevent collapse of said bellows.

3. An accumulator for hydraulic systems comprising a hollow, tubular cylinder, having closure members at opposite ends, a hollow expansible and contractible metallic bellows secured in one end of said cylinder and having a free end movable toward one of said closure members upon expansion of said bellows, means forming a port in said one closure member for connection with said hydraulic system, an annular valve seat encircling said port, a valve seat member within said cylinder spaced axially from said one closure and disposed radially outward of said bellows, and a valve member carried by said free end of said bellows and engageable with said valve seats to trap hydraulic fluid between said bellows and said cylinder upon contraction and expansion of said bellows to predetermined limits.

4. An accumulator for hydraulic systems comprising a hollow, tubular cylinder, having closure members at opposite ends, a hollow expansible and contractible metallic bellows secured in one end of said cylinder and having a free end movable toward one of said closure members upon expansion of said bellows, means forming a port in said one closure for connection with said hydraulic system, a plate member on the free end of said bellows, an annular groove in said plate member substantially concentric with said port and of greater diameter than said port, a rubbery, toroidal ring in and projecting from said groove, and movable with said plate member into and out of engagement with said one closure, a member within said cylinder providing an annular valve seat spaced axially from said one end closure and disposed outwardly of said bellows, an annular groove in said annular valve seat, a second rubbery, toroidal ring in and projecting from said groove, said plate member being engageable with said end closure and said valve seat and said second ring to trap hydraulic fluid between said bellows and said cylinder upon contraction and expansion of said bellows to predetermined limits.

5. An accumulator for hydraulic systems comprising a hollow, tubular cylinder having closure members at its opposite ends, a hollow, expansible and contractible metallic bellows, having one end secured adjacent one end of said cylinder and its opposite end free to expand toward and contract away from the end closure at the opposite end of said cylinder, means including a port in the last-mentioned closure for connecting the cylinder to a hydraulic system, a valve seat in said cylinder disposed outwardly of said bellows, a groove in said valve seat, a rubbery sealing member in and projecting slightly from said groove, and a valve member on said free end of said bellows engageable with said sealing member and said valve seat upon contraction of said bellows.

BENJAMIN N. ASHTON.